United States Patent
Tatara et al.

(10) Patent No.: US 8,851,730 B2
(45) Date of Patent: Oct. 7, 2014

(54) VEHICLE LAMP

(71) Applicants: Naohisa Tatara, Shizuoka (JP); Michihiko Hayakawa, Shizuoka (JP)

(72) Inventors: Naohisa Tatara, Shizuoka (JP); Michihiko Hayakawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 2 days.

(21) Appl. No.: 13/862,864

(22) Filed: Apr. 15, 2013

(65) Prior Publication Data
US 2013/0272013 A1     Oct. 17, 2013

(30) Foreign Application Priority Data

Apr. 17, 2012   (JP) .................. 2012-093760

(51) Int. Cl.
*B60Q 1/00*     (2006.01)
*B60Q 1/14*     (2006.01)
*F21S 8/10*     (2006.01)

(52) U.S. Cl.
CPC .............. *B60Q 1/0005* (2013.01); *B60Q 1/143* (2013.01); *B60Q 1/0023* (2013.01); *F21S 48/1233* (2013.01)
USPC .......................................... 362/546; 362/466

(58) Field of Classification Search
CPC ....... B60Q 1/005; B60Q 1/0023; B60Q 1/143
USPC .................................. 362/464, 465, 466, 546
See application file for complete search history.

(56) References Cited

U.S. PATENT DOCUMENTS

| | | | |
|---|---|---|---|
| 2002/0048086 A1* | 4/2002 | Bos ............................... | 359/566 |
| 2004/0143380 A1* | 7/2004 | Stam et al. ..................... | 701/36 |

FOREIGN PATENT DOCUMENTS

JP     2010-260379 A     11/2010

* cited by examiner

*Primary Examiner* — David V Bruce
(74) *Attorney, Agent, or Firm* — Sughrue Mion, PLLC

(57) ABSTRACT

A transparent member 2 defines part of a lamp compartment 4. A light source 5a is accommodated within the lamp compartment 4 and shines light to the front through the transparent member 2. A detection device 6 is accommodated within the lamp compartment 4 and obtains information on what exists ahead. A stepped portion 7 is formed on an external surface of the transparent member 2 and guides drops of water which adhere to the external surface so as to avoid a detection enabled area of the detection device 6.

5 Claims, 4 Drawing Sheets

VEHICLE LAMP

CROSS-REFERENCE TO RELATED APPLICATIONS

The present application claims the benefit of priority of Japanese Patent Application No. 2012-093760, filed on Apr. 17, 2012, which is incorporated herein by reference.

BACKGROUND

1. Field of the Invention

The present invention relates to a lamp mounted on a vehicle.

2. Related Art

A vehicle lamp is known in which an imaging device for capturing an image of what exists ahead of a vehicle is incorporated to detect an obstacle or a vehicle existing ahead of the vehicle (refer to JP-A-2010-260379). Then, the light distribution of the headlamp is controlled in accordance with the position of the obstacle or the vehicle detected.

The imaging device captures an image of what exists ahead of the vehicle through a transparent cover which defines a lamp compartment. Consequently, in the event where drops of water adhere to an external surface of the transparent cover when it is raining or snowing, the drops of water are also captured in the image so captured, and therefore, the situations ahead of the vehicle cannot be grasped accurately, causing fears that the light distribution of the headlamp cannot be controlled accurately.

Consequently, an object of the invention is to provide a technique for executing an accurate light distribution control even when it is raining or snowing.

SUMMARY

One or more embodiments of the present invention provides a technique for a vehicle lamp comprising a transparent member which defines part of a lamp compartment, a light source that is accommodated in the lamp compartment and which shines light to the front through the transparent member, a detection device that is accommodated in the lamp compartment and which obtains information on what exists ahead through the transparent member, and a stepped portion that is formed on an external surface of the transparent member and which guides drops of water adhering to the external surface so as to avoid a detection enabled area if the detection device.

According to one or more embodiments of the invention, it is possible to avoid a risk of the obtainment of information on what exists ahead being interrupted by drops of water running across the detection enabled area of the detection device. Consequently, even when it is raining or snowing, the information on what exists ahead can be obtained in an ensured fashion, whereby an accurate light distribution control can be executed.

Drops of water flowing downwards due to gravity can be guided so as to avoid the detection enabled area of the detection device when the portion which guides drops of water from top to bottom is provided, whereas drops of water caused to flow upwards due to wind pressure resulting when the vehicle is running can be guided so as to avoid the detection enabled area of the detection device when the portion which guides drops of water from bottom to top is provided.

The stepped portion may be formed by causing part of the external surface of the transparent member to project outwards. As this occurs, in molding the stepped portion together with the transparent member, a high moldability can easily be obtained, contributing to the suppression of production costs.

The detection device may include an imaging device, and the detection enabled area may correspond to the angle of view of the imaging device. When an imaging device which is easily affected by drops of water in obtaining information on what exists ahead is used for a detection device, the advantage of the invention becomes remarkable.

The imaging device may be disposed above the light source. As this occurs, it is possible to prevent drops of water or snow illuminated by a beam of light emitted from the light source from being captured by the imaging device. Consequently, the accuracy with which information on what exists ahead is captured by the imaging device can be increased.

DETAILED DESCRIPTION

Hereinafter, embodiments of the present invention will be described in detail with reference to the drawings. It should be noted that in each of the drawings used in the description below, in order to show constituent members in recognizable sizes, the reduction scale is changed as required. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
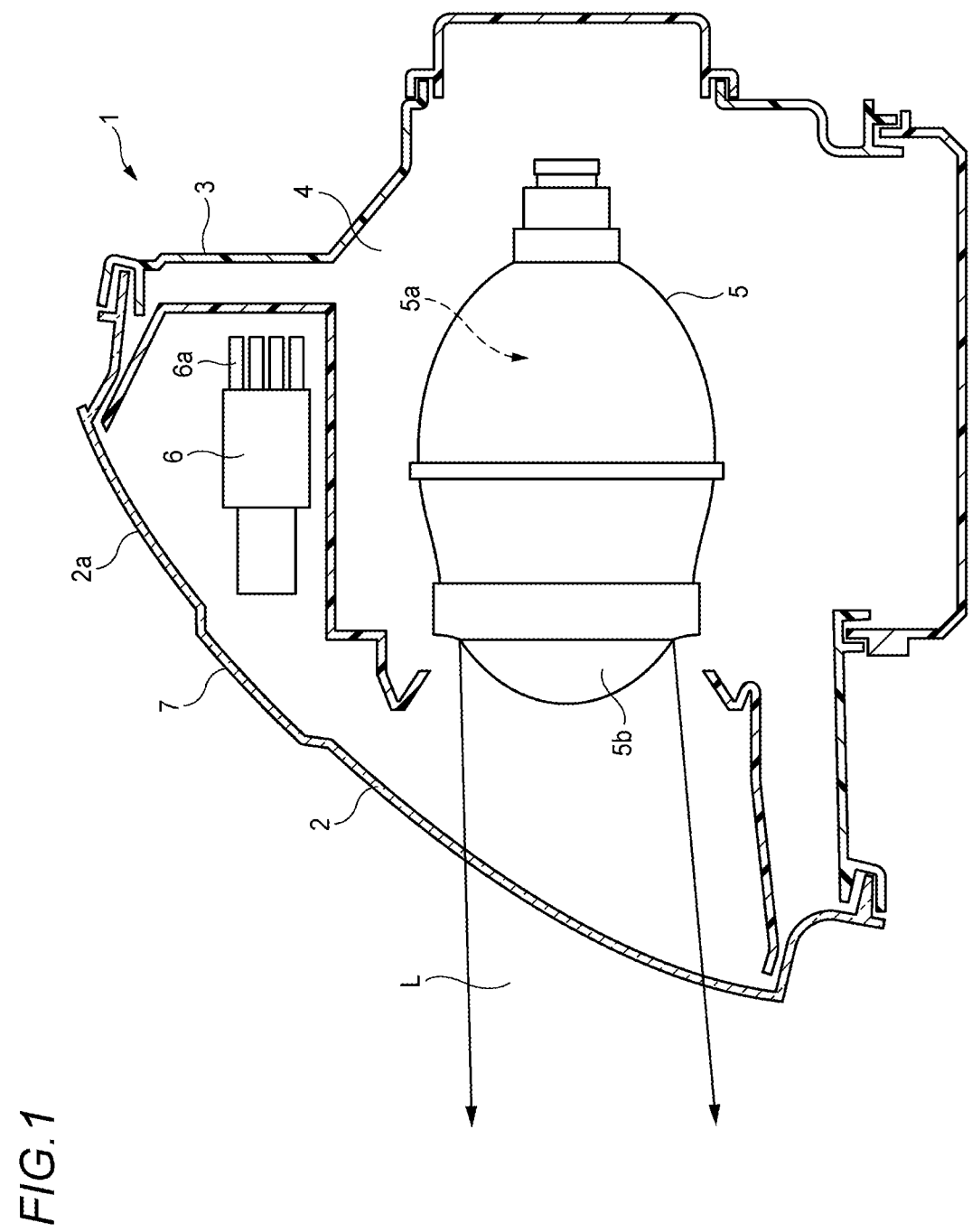
FIG. 1 is an exemplary diagram of an inner configuration of a vehicle lamp according to an embodiment of the invention.

FIG. 1 is an exemplary diagram of an internal configuration of a vehicle lamp 1 according to an embodiment of the invention. The vehicle lamp 1 includes a lamp compartment 4 which is defined by attaching a transparent cover 2, which is a transparent member of the invention, to a front portion of a lamp housing 3. A lamp unit 5 and an imaging device 6 are accommodated in the lamp compartment 4.

The lamp unit 5 incorporates a halogen lamp as a light source 5a. Light emitted from the light source 5a passes through a projection lens 5b and forms a predetermined light distribution pattern on a predetermined area lying ahead of a vehicle.

The imaging device 6, which is a detection device of the invention, is a CCD camera which obtains information on what exists ahead of the vehicle through the transparent cover 2. The imaging device 6 is disposed above the lamp unit 5 and includes heat dissipating fins 6a.

A control unit, not shown, controls the light distribution of the lamp unit 5 based on the information on what exists ahead of the vehicle which is obtained by the imaging device 6. Specifically, the control unit controls the orientation of an optical axis of the lamp unit 5 and the shape of a light distribution pattern formed.

A stepped portion 7 is formed at a portion on the transparent cover 2 which faces oppositely the imaging device 6. Specifically, part of an external surface 2a of the transparent cover 2 is caused to project outwards to thereby form the stepped portion 7.

Figure 2:
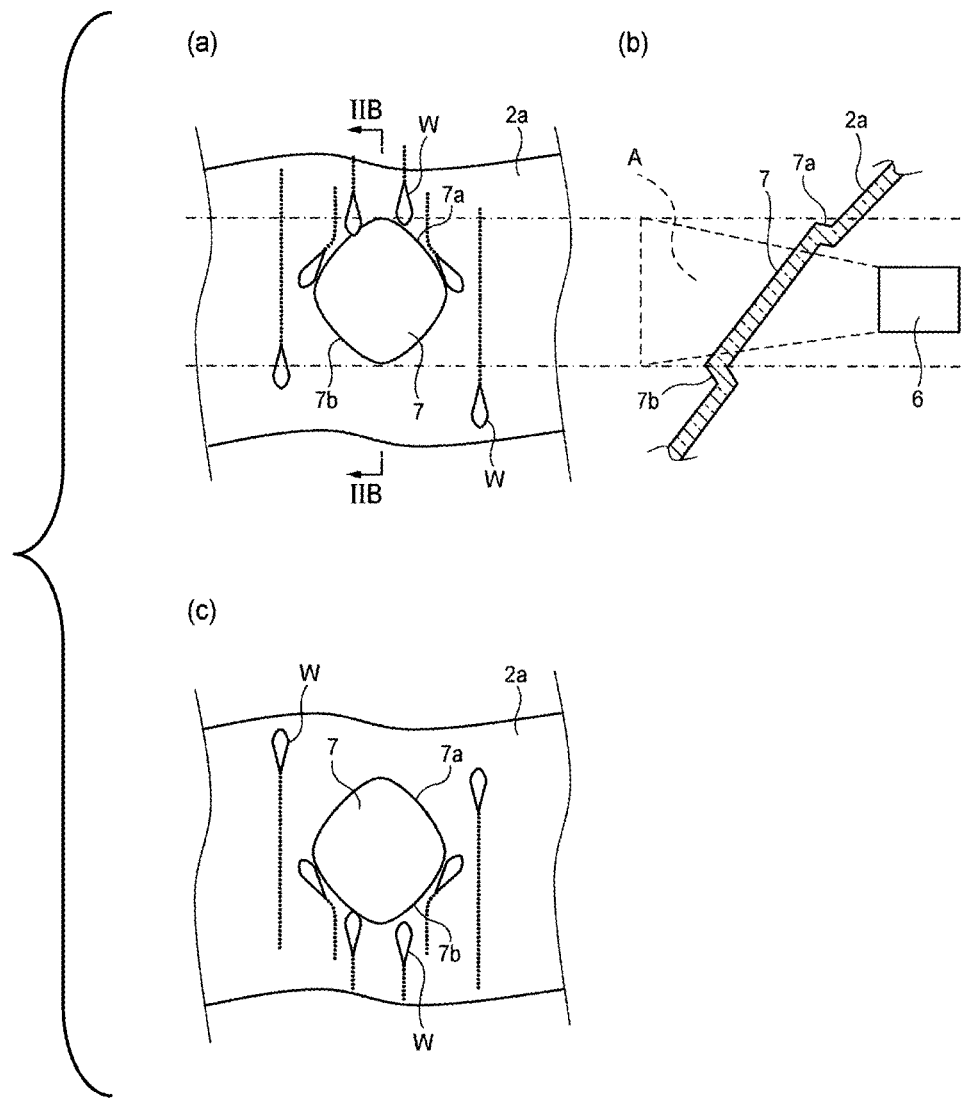
FIG. 2 shows explanatory diagrams illustrating the function of a stepped portion formed on a transparent cover.

FIG. 2 shows explanatory diagrams illustrating the stepped portion 7. An external appearance of the stepped portion 7 as seen from the front is shown at (a), and a sectional view thereof taken along the line IIB-IIB at (a) is shown at (b).

The stepped portion 7 has a shape which guides drops of water W adhering to the external surface 2a of the transparent cover 2 so as to avoid a detection enabled area A of the imaging device 6. Specifically, the stepped portion 7 has a rhombus and includes an upper guide portion 7a which guides drops of water W from top to bottom and a lower guide portion 7b which guides drops of water W from bottom to top. In the case of this embodiment, the detection enabled area A corresponds to the angle of view of the camera or the imaging device 6.

For example, when it is raining, drops of water W which adhere to the external surface 2a of the transparent cover 2 are allowed to flow downwards due to gravity. According to the configuration of this embodiment, the flowing drops of water W are forced to change their directions to flow along the upper guide portion 7a, whereby the drops of water W flows downwards while avoiding the field of view of the imaging device 6. Consequently, it is possible to avoid a risk of the obtainment of information on what exists ahead of the vehicle being interrupted by drops of water which run across the field of view of the imaging device 6.

When the vehicle is running, drops of water W which adhere to the external surface 2a of the transparent cover 2 are caused to flow upwards due to wind pressure from the front. According to the configuration of this embodiment, as shown at (c) in FIG. 2, the flowing drops of water W are forced to change their directions along the lower guide portion 7b and are then guided upwards while avoiding the field of view of the imaging device 6. Consequently, it is possible to avoid the risk of the obtainment of information on what exists ahead of the vehicle being interrupted by drops of water which run across the field of view of the imaging device 6.

Consequently, even when it is raining or snowing, the information on what exists ahead of the vehicle can be obtained in an ensured fashion, thereby making it possible to execute an accurate light distribution control.

Since the stepped portion 7 is formed by causing part of the external surface 2a of the transparent cover 2 to project outwards, in being molded together with the transparent cover 2, it is possible to obtain easily a high moldability, this contributing to suppress the production costs.

In addition, since the imaging device 6 is disposed above the light source 5a, it is possible to restrain drops of water or snow illuminated by a beam of light L emitted from the lamp unit 5 from being captured by the imaging device 6. Consequently, it is possible to increase the accuracy with which information on what exists ahead of the vehicle is captured by the imaging device 6.

The embodiment is intended to facilitate the understanding of the invention and hence is not intended to limit the scope of the invention. It is obvious that the invention can be modified or improved without departing from the spirit and scope of the invention and that the invention includes its equivalents.

The shape of the stepped portion 7 is not limited to the rhombus described above. As long as the stepped portion 7 can guide drops of water so as to avoid the field of view of the imaging device 6, any shapes can be adopted.

Figure 3:
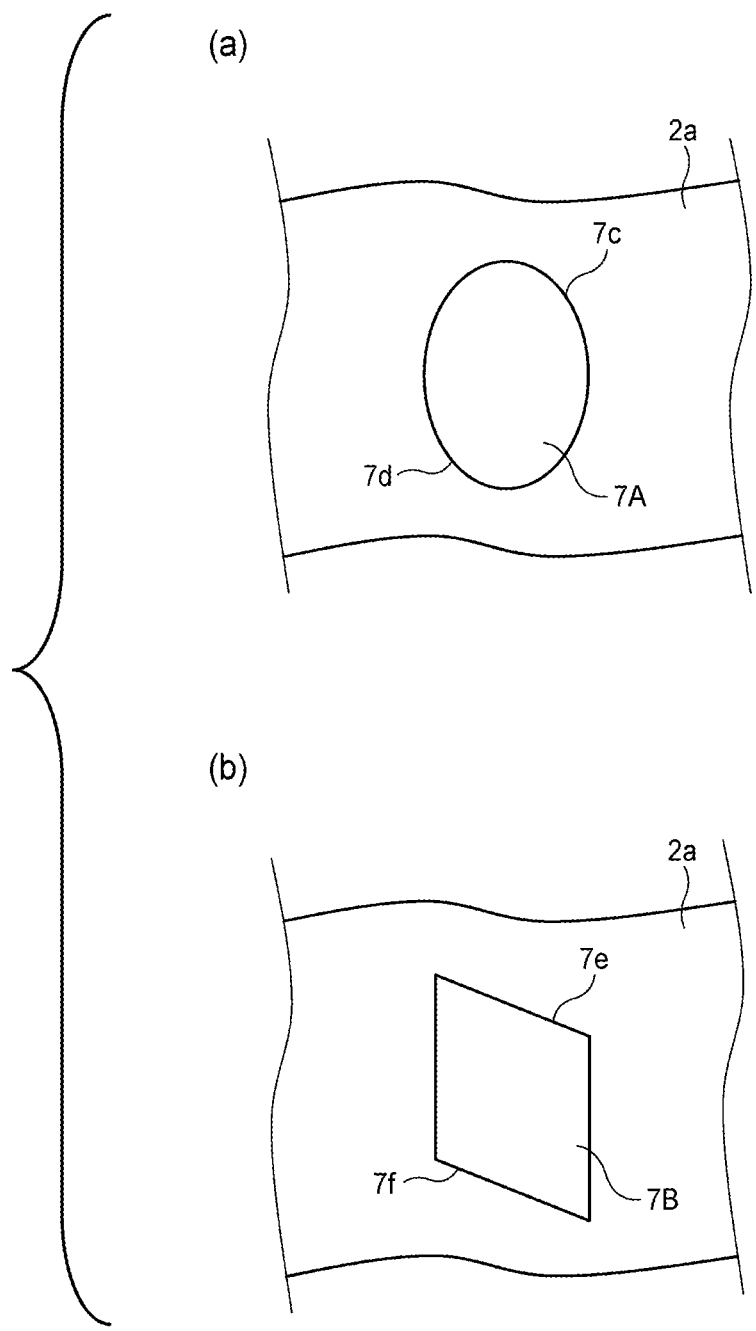
FIG. 3 shows explanatory diagrams illustrating a modified example of a stepped portion.

As shown at (a) in FIG. 3, for example, a stepped portion 7A may be formed which exhibits an oval shape having an arc-shaped upper guide portion 7c and an arc-shaped lower guide portion 7d. Although a round shape may be adopted, the guiding capability of drops of water W is increased by an oval shape of which a major axis is oriented vertically.

In addition, as shown at (b) in FIG. 3, a stepped portion 7B may be formed which exhibits a parallelogram having a straight upper guide portion 7e and a straight lower guide portion 7f which extend in a direction in which the upper and lower guide portions 7e, 7f intersect obliquely a traveling direction of the drops of water.

In forming the upper guide portion 7a and the lower guide portion 7b, the whole of the stepped portion 7 does not necessarily have to be caused to project outwards of the external surface 2a of the transparent cover 2.

Figure 4:
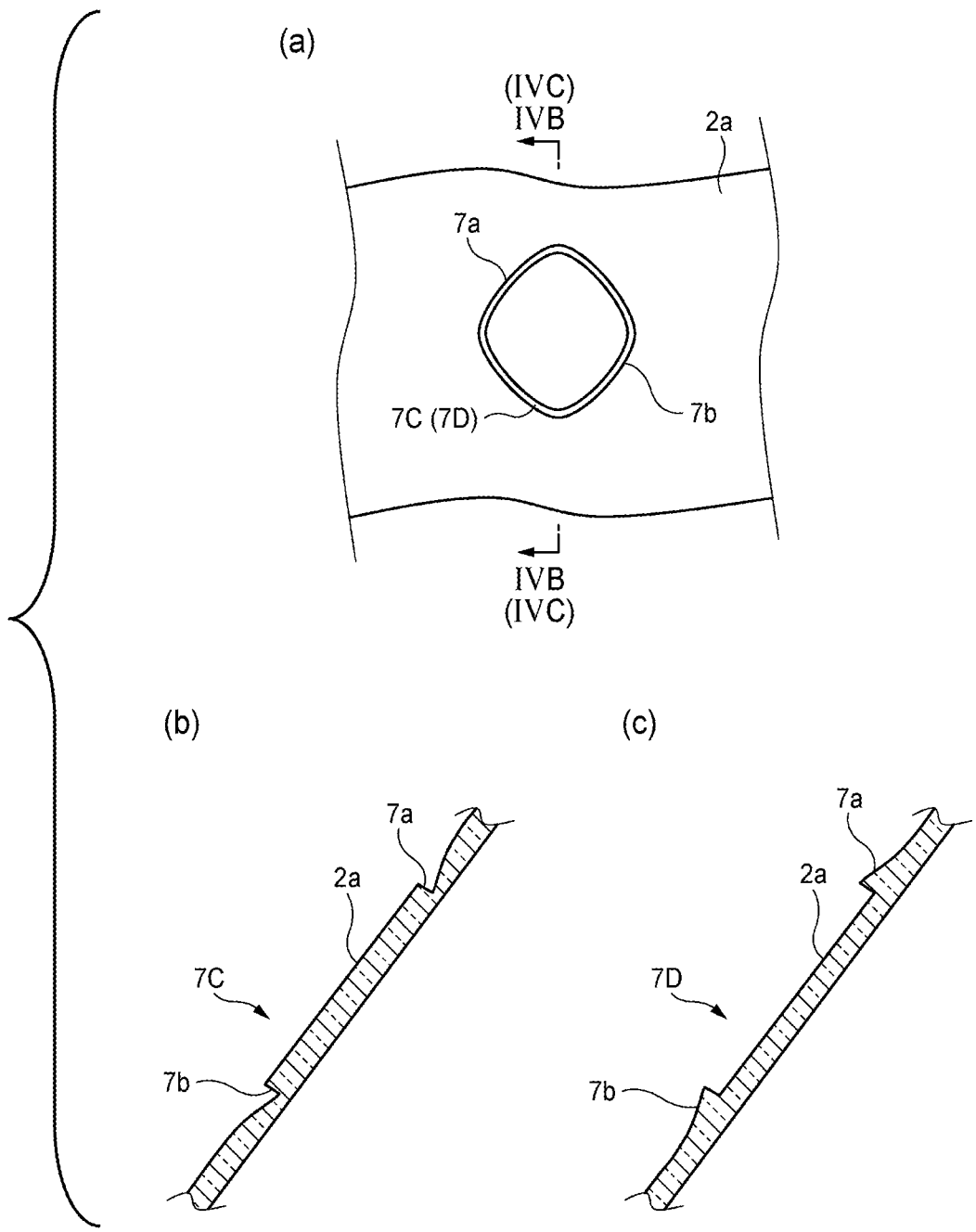
FIG. 4 shows explanatory diagrams illustrating another modified example of a stepped portion.

For example, as shown at (a) and (b) in FIG. 4, a stepped portion 7C having an upper guide portion 7a and a lower guide portion 7b may be formed by forming a rhombic groove in the external surface 2a of the transparent cover 2. A sectional shape of the stepped portion 7C taken along the line IVB-IVB at (a) in FIG. 4 is shown at (b) in FIG. 4. The design property of the vehicle lamp can be increased by adopting this configuration.

Additionally, as shown at (C) in FIG. 4, a stepped portion 7D having an upper guide portion 7a and a lower guide portion 7b may be formed by forming a rhombic frame on the external surface 2a of the transparent cover 2. A sectional shape of the stepped portion 7D taken along the line IVC-IVC at (a) in FIG. 4 is shown at (c) in FIG. 4. It is also possible to increase the design property of the vehicle lamp by adopting this configuration.

A stepped portion may be formed which exhibits a shape that is formed by combining any of the upper guide portions 7a, 7c, 7e and any of the lower guide portions 7b, 7d, 7f together. The stepped portion may also be formed which is in the form of only at least any one of the upper guide portions 7a, 7c, 7e and any of the lower guide portions 7b, 7d, 7f.

The imaging device 6, which is the detection device of the invention, is not limited to the CCD camera. Known imaging devices can be adopted as required, as long as they can obtain information on what exists ahead of the vehicle.

In addition, the detection device is not limited to the imaging device. The invention can be applied to detection devices whose detection results are affected by the existence of drops of water within the detection enabled area thereof. For example, a millimeter wave sensor can be adopted in place of the imaging device 6.

The light source 5a is not limited to the halogen lamp. Appropriate bulb light sources including an HID (High Intensity Discharge) lamp can be adopted.

Additionally, the light source 5a is not limited to the bulb light sources. Light emitting devices such as light emitting diodes and laser diodes can be adopted as light sources. As this occurs, the requirement required of the light source to deal with heat is mitigated, and therefore, the imaging device 6 does not have to be provided with the fins 6a.

The vehicle lamp of the invention is not limited to the headlamp. Namely, the information on what exists "ahead" that is obtained by the detection device is not limited to the information on what exists ahead of the vehicle. The invention can be applied to every vehicle lamp which controls the light distribution thereof according to information obtained on what exists "ahead."

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle lamp comprising:
a transparent member which defines part of a lamp compartment;
a light source that is accommodated in the lamp compartment and which shines light to the front through the transparent member;
a detection device that is accommodated in the lamp compartment and which obtains information on what exists ahead through the transparent member; and
a stepped portion that is formed on an external surface of the transparent member and which guides drops of water adhering to the external surface so as to avoid a detection enabled area if the detection device.

2. The vehicle lamp according to claim 1, wherein the stepped portion comprises at least either of a portion which guides drops of water from top to bottom and a portion which guides drops of water from bottom to top.

3. The vehicle lamp according to claim 1, the stepped portion is formed by causing part of the external surface of the transparent member to project outwards.

4. The vehicle lamp according to claim 1, the detection device comprises an imaging device, and the detection enabled area corresponds to an angle of view of the imaging device.

5. The vehicle lamp according to claim 4, the imaging device is disposed above the light source.

* * * * *